US011854513B2

(12) United States Patent
Endo

(10) Patent No.: US 11,854,513 B2
(45) Date of Patent: Dec. 26, 2023

(54) SEMICONDUCTOR DEVICE HAVING AN INTERFACE FOR DIGITAL VIDEO SIGNALS

(71) Applicant: ROHM CO., LTD., Kyoto (JP)

(72) Inventor: Hiroharu Endo, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 17/489,234

(22) Filed: Sep. 29, 2021

(65) Prior Publication Data
US 2022/0020341 A1 Jan. 20, 2022

Related U.S. Application Data

(63) Continuation of application No. PCT/JP2020/013318, filed on Mar. 25, 2020.

(30) Foreign Application Priority Data

Mar. 29, 2019 (JP) ................. 2019-066742

(51) Int. Cl.
*G09G 5/38* (2006.01)
*G09G 5/377* (2006.01)
*H04N 5/66* (2006.01)
*G06T 1/60* (2006.01)

(52) U.S. Cl.
CPC ............... *G09G 5/38* (2013.01); *G09G 5/377* (2013.01); *H04N 5/66* (2013.01); *G06T 1/60* (2013.01); *G09G 2340/10* (2013.01)

(58) Field of Classification Search
None
See application file for complete search history.

(56) References Cited

U.S. PATENT DOCUMENTS

| 6,118,452 A | 9/2000 | Gannett | |
|---|---|---|---|
| 7,667,734 B2 * | 2/2010 | Uehara | H04N 17/045 348/184 |
| 2009/0207188 A1 * | 8/2009 | Koyama | G09G 3/001 345/629 |
| 2012/0144181 A1 * | 6/2012 | Lin | G06F 9/4401 713/2 |
| 2017/0017617 A1 * | 1/2017 | Sato | G06F 16/00 |

(Continued)

FOREIGN PATENT DOCUMENTS

| JP | H05165452 A | * | 7/1993 |
|---|---|---|---|
| JP | H05165452 A | | 7/1993 |

(Continued)

OTHER PUBLICATIONS

PCT International Preliminary Examination Report on Patentability with Written Opinion of the International Searching Authority for International Application No. PCT/2020/013318; dated Oct. 14, 2021.

(Continued)

*Primary Examiner* — Patrick F Valdez
(74) *Attorney, Agent, or Firm* — CANTOR COLBURN LLP

(57) ABSTRACT

A video input interface receives video data on which a known character is to be drawn. A memory stores reference graphic data describing the known character. A visibility detector checks the visibility of the known character drawn on the video data based on the reference graphic data.

10 Claims, 14 Drawing Sheets

(56) References Cited

U.S. PATENT DOCUMENTS

2019/0213071 A1* 7/2019 Anand ............... G06F 11/1004
2021/0362598 A1* 11/2021 Oh ..................... B60W 60/001

FOREIGN PATENT DOCUMENTS

| JP | H06317782 A |   | 11/1994 |
|----|-------------|---|---------|
| JP | 2002169524 A |   | 6/2002 |
| JP | 2006033667 A |   | 2/2006 |
| JP | 2016084020 A |   | 5/2016 |
| JP | 2018132648 A | * | 8/2018 |
| JP | 2018132648 A |   | 8/2018 |

OTHER PUBLICATIONS

JPO Notice of Reasons for Refusal for corresponding JP Application No. 2021-511864; dated Apr. 26, 2022.
CNIPA First Office Action for corresponding Cn Application No. 202080018989.2; dated Jul. 31, 2023.

* cited by examiner

SEMICONDUCTOR DEVICE HAVING AN INTERFACE FOR DIGITAL VIDEO SIGNALS

CROSS REFERENCE TO RELATED APPLICATIONS

This application is a continuation under 35 U.S.C. § 120 of PCT/JP2020/013318, filed Mar. 25, 2020, which is incorporated herein reference and which claimed priority to Japanese Application No. 2019-066742, filed Mar. 29, 2019. The present application likewise claims priority under 35 U.S.C. § 119 to Japanese Application No. 2019-066742, filed Mar. 29, 2019, the entire content of which is also incorporated herein by reference.

BACKGROUND

1. Technical Field

The present disclosure relates to a semiconductor device having an interface for digital video signals.

2. Description of the Related Art

FIG. 1 is a block diagram of an image display system. An image display system 100R includes a display panel 102 such as a liquid crystal panel or an organic EL panel, a gate driver 104, a source driver 106, a graphic controller 110, and a timing controller 200R. The graphic controller 110 generates image data to be displayed on the display panel 102. Pixel (RGB) data included in the image data is transmitted to the timing controller 200R in a serial format.

The timing controller 200R receives the image data and generates various control/synchronization signals. The gate driver 104 sequentially selects a scan line Ls of the display panel 102 in synchronization with a signal from the timing controller 200R. Further, the RGB data is fed to the source driver 106.

The timing controller 200R includes a reception circuit 202, a transmission circuit 204, and a logic circuit 210. The reception circuit 202 receives the image data in a serial format from the graphic controller 110. An external ROM 111 stores an ID (identification information), resolution, refresh rate, and the like of the display panel 102. The logic circuit 210 generates the control/synchronization signal based on the image data received by the reception circuit 202. The transmission circuit 204 outputs the control signal or the image data to the gate driver 104 and the source driver 106.

The timing controller 200R may be required to have an on screen display (OSD) function of displaying a predetermined character, figure, icon, or the like separately from the image data received by the reception circuit 202. This requires that the logic circuit 210 be provided with an OSD circuit 212. Hereinafter, characters, figures, icons, and the like are collectively referred to as OSD characters.

The ROM 111 stores bitmap data of several OSD characters. The timing controller 200R reads, from the ROM 111, the bitmap data of an OSD character in accordance with the control signal input separately from the image data, and displays the bitmap data on the display panel 102.

FIG. 2A is a diagram illustrating an example of the OSD character, and FIG. 2B is a diagram illustrating a state where the OSD character overlays image data. As illustrated in FIG. 2B, the visibility of the OSD character may be significantly lowered in a manner that depends on a relationship between the color and brightness of the OSD character and the color and brightness of the image data serving as a background.

In order to solve such a problem, a visibility detection function may be implemented in the timing controller. The visibility detection function is a function of determining the visibility of the OSD character by comparing a difference in color or brightness between the OSD character and the background with a threshold. A result of the determination is notified to the graphic controller 110, and the graphic controller 110 takes measures when the visibility is low.

The OSD function may be implemented in the graphic controller 110. This requires that the graphic controller 110 perform the visibility detection on the image data overlaid with the OSD character. However, the fact is that the graphic controller 110 does not detect the visibility of the OSD character.

Further, noise may come in during transmission of the image data from the graphic controller 110 to the timing controller 200R. Accordingly, even with the visibility detection function implemented in the graphic controller 110, the visibility of the OSD character is possibly lowered due to noise, and it is not preferable that such an image be displayed on the display panel 102.

SUMMARY

The present disclosure has been made in view of such a circumstance.

One embodiment of the present disclosure relates to a semiconductor device. The semiconductor device includes a video input interface structured to receive video data on which a known character is to be drawn, a memory structured to store reference graphic data describing the known character, and a visibility detector structured to check, based on the reference graphic data, visibility of the known character that is drawn on the video data.

Note that any combination of the above-described components, or an entity that results from replacing expressions of the present disclosure among a method, an apparatus, and the like is also valid as an embodiment of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Summary of Embodiment

Figure 1:
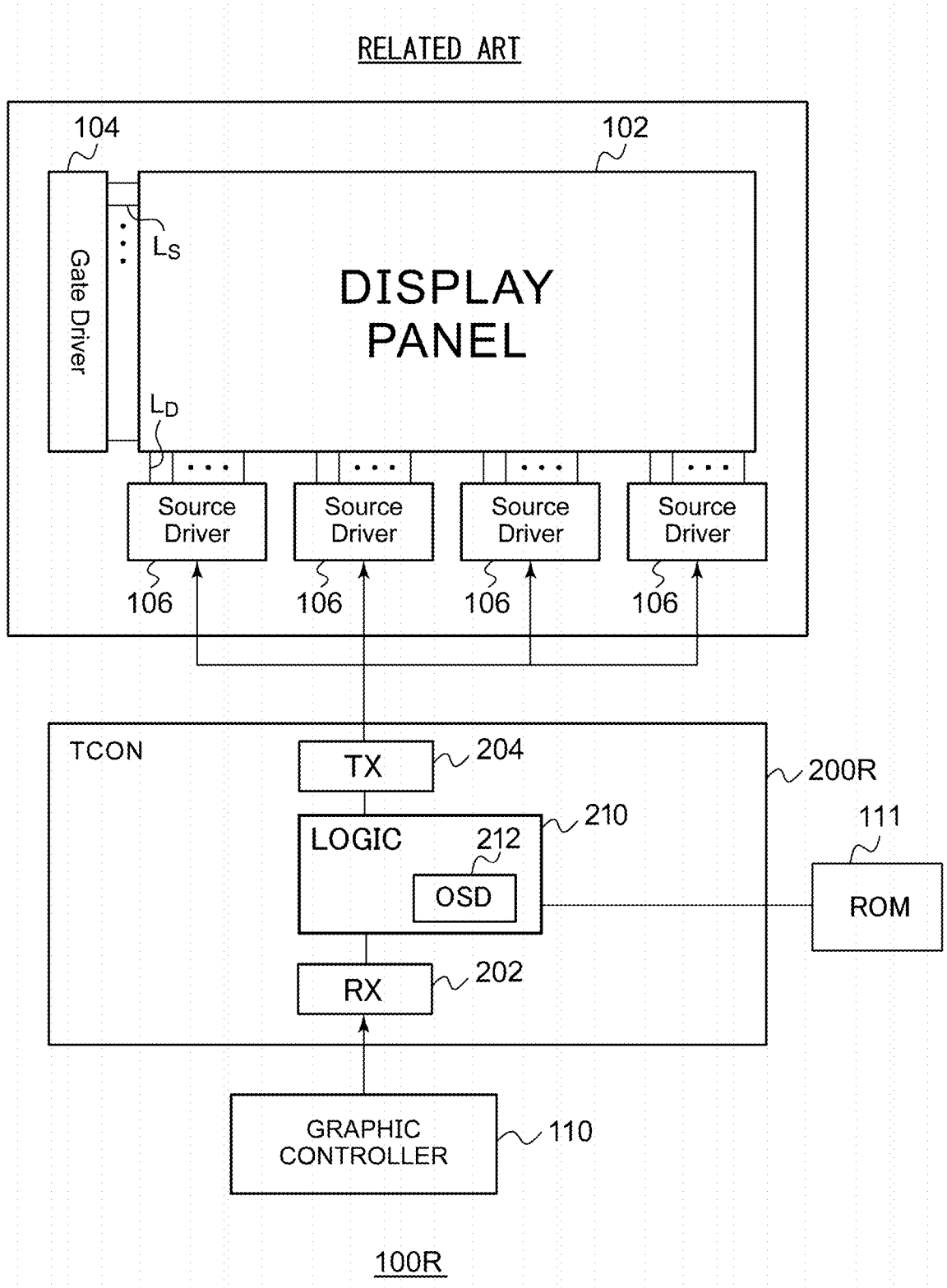
FIG. 1 is a block diagram of an image display system.
Figure 2A:
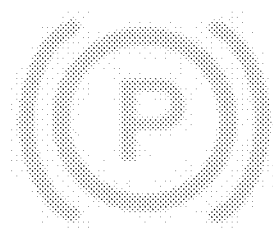
FIG. 2A is a diagram illustrating an example of an OSD character.
Figure 2B:
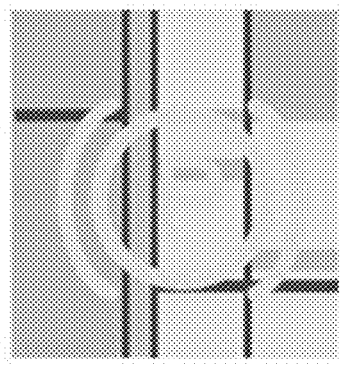
FIG. 2B is a diagram illustrating a state where the OSD character overlays image data.

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

One embodiment disclosed herein relates to a semiconductor device. The semiconductor device includes a video input interface that receives video data on which a known character is to be drawn, a memory that stores reference graphic data describing the known character, and a visibility detector that checks visibility of the known character drawn on the video data based on the reference graphic data.

Information on the known character that is to be drawn in the video data by a graphic controller is stored in the semiconductor device as the reference graphic data, so that the semiconductor device can check the visibility. With a visibility detection function implemented in the semiconductor device, even when the visibility of the character is lowered due to noise during transmission of the video data from the graphic controller to the semiconductor device or a failure or abnormality in the video interface, the visibility can be detected.

In one embodiment, the visibility detector may determine whether the visibility is good or poor for each of a plurality of pixels constituting a background lying within a target region where the known character is drawn. The visibility detector may determine that the visibility of the known character is poor when the number of pixels with poor visibility exceeds a pixel count threshold.

In one embodiment, the semiconductor device may further include a drawing error detector that determines whether the known character drawn on the video data is normal or abnormal based on the reference graphic data. This enables the semiconductor device to detect an abnormality in the video interface or the graphic controller, or image disturbance due to noise.

In one embodiment, the visibility detector and the drawing error detector may be alternately put into operation every other frame.

In one embodiment, the semiconductor device may further include a control input interface provided separately from the video input interface, the control input interface enabling the semiconductor device to communicate with an external processor.

In one embodiment, the known character may be variable in display position. A control signal received by the control input interface from the processor may include position information indicating the display position of the known character. The visibility detector is capable of determining the position of the character based on the position information.

In one embodiment, the semiconductor device may further include a control input interface provided separately from the video input interface, the control input interface enabling the semiconductor device to communicate with an external processor. The control signal received by the control input interface from the processor may include at least either information indicating whether the known character is subject to the determination made by the visibility detector or the drawing error detector or information indicating whether the current frame is subject to the determination made by the visibility detector or the drawing error detector.

In one embodiment, the semiconductor device may further include an on screen display (OSD) circuit that draws an OSD character on the video data. In this case, an additional OSD function can be provided separately from the OSD function of the graphic controller.

In one embodiment, the OSD circuit may be capable of drawing the known character described by the reference graphic data as the OSD character. In this case, for example, when the OSD function of the graphic controller is in failure, the OSD circuit of the semiconductor device can work as an alternative, so that robustness of the image display system can be increased.

Embodiment

Hereinafter, the present disclosure will be described based on preferred embodiments with reference to the drawings. The same or equivalent components, members, and processes shown in the drawings are denoted by the same reference numerals, and redundant description will be omitted as needed. Further, the embodiments are not intended to limit the disclosure but are merely given as examples, and all features described in the embodiments and combinations of the features are not necessarily essential to the disclosure.

Herein, "A state where a member A is connected to a member B" includes not only a state where the member A and the member B are physically and directly connected to each other, but also a state where the member A and the member B are indirectly connected to each other via another member that has no substantial effect on an electrical connection state between the member A and the member B or that does not impair a function or effect produced by the connection between the member A and the member B.

Likewise, "A state where a member C is provided between the member A and the member B" includes not only a state where the member A and the member C, or the member B and the member C are directly connected to each other, but also a state where the members are indirectly connected via another member that has no substantial effect on an electrical connection state between the members or that does not impair a function or effect produced by the connection between the members.

Figure 3:
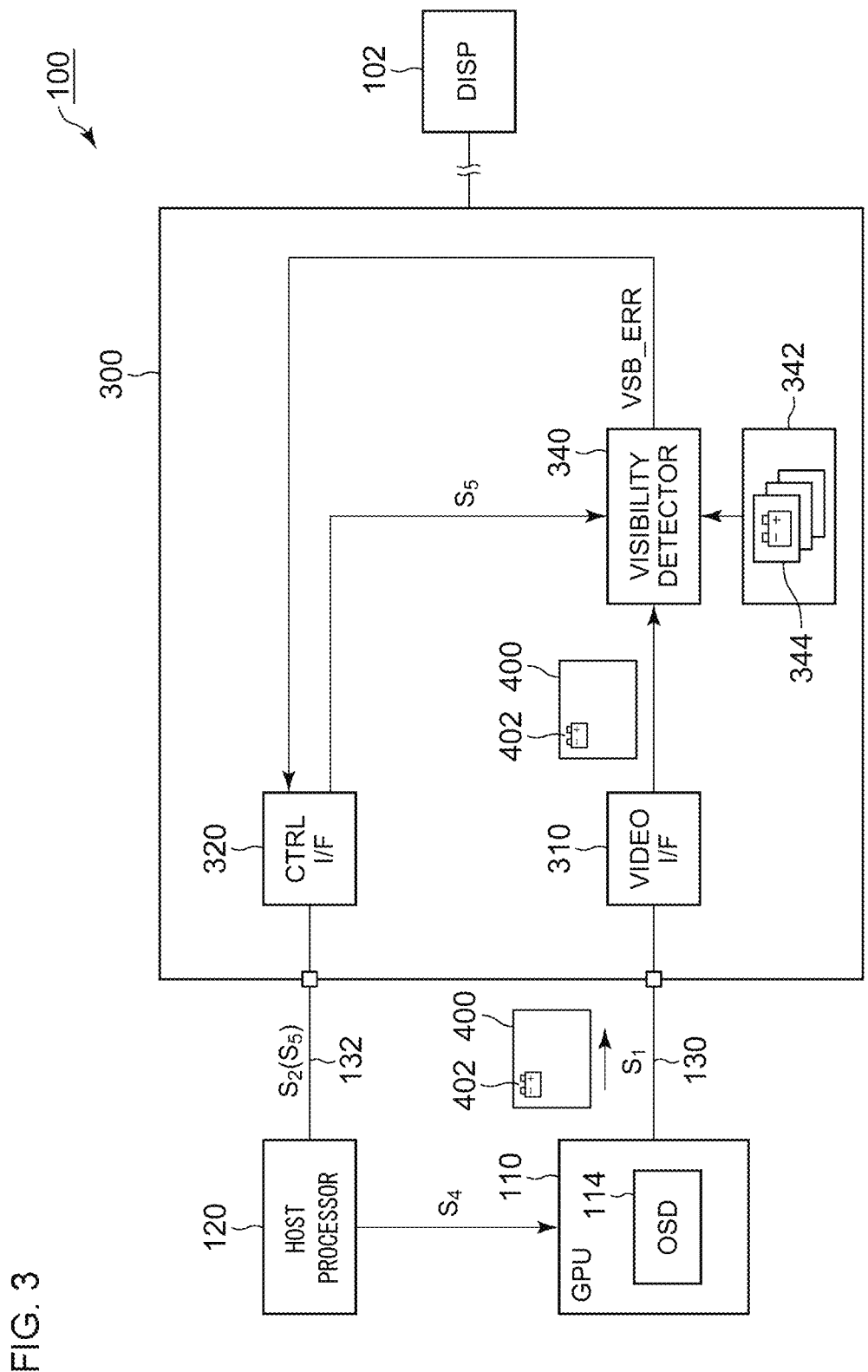
FIG. 3 is a block diagram of an image display system including a semiconductor device according to a first embodiment.

FIG. 3 is a block diagram of an image display system 100 including a semiconductor device 300 according to a first embodiment. The image display system 100 includes the semiconductor device 300, a display panel 102, a graphic controller 110, and a host processor 120.

The graphic controller 110 is a graphics processing unit (GPU) or the like, and generates video data 400. The graphic controller 110 includes a transmitter (video output interface) conforming to HDMI (registered trademark) standard, DisplayPort standard, Digital Visual Interface (DVI) standard, or the like, and is connected to the semiconductor device 300 over a video transmission line 130. A digital video signal $S_1$ including the video data 400 is transmitted to the semiconductor device 300 in a serial format.

A known character is possibly drawn on the video data 400. For example, the graphic controller 110 includes an OSD circuit 114, and overlays a predetermined character (also referred to as an OSD character) 402 on the video data.

The host processor 120 controls the image display system 100 in a centralized manner. The host processor 120 and the semiconductor device 300 are connected over a control line 132 provided separately from the video transmission line 130. The I²C interface or SPI is applicable to the control line 132.

For example, the graphic controller 110 draws the OSD character 402 on the video data 400 in accordance with a control command $S_4$ transmitted from the host processor 120. In this case, the host processor 120 knows what kind of character has been drawn on the video data 400. The graphic controller 110 and the host processor 120 may be unified.

The semiconductor device 300 includes a video input interface 310, a control input interface 320, a visibility detector 340, and a memory 342. The video input interface 310 receives the digital video signal $S_1$ from the graphic controller 110. The video data 400 included in the digital video signal $S_1$ is fed to and displayed on the display panel 102.

The control input interface 320 receives control data $S_2$ from the host processor 120. The control data $S_2$ may include information $S_5$ on the OSD character 402 to be drawn on the video data 400 in transit. The information $S_5$ may include an ID indicating the type of the OSD character. When the OSD character 402 is variable in drawing position, the information $S_5$ may include the drawing position of the OSD character 402.

Figure 4:
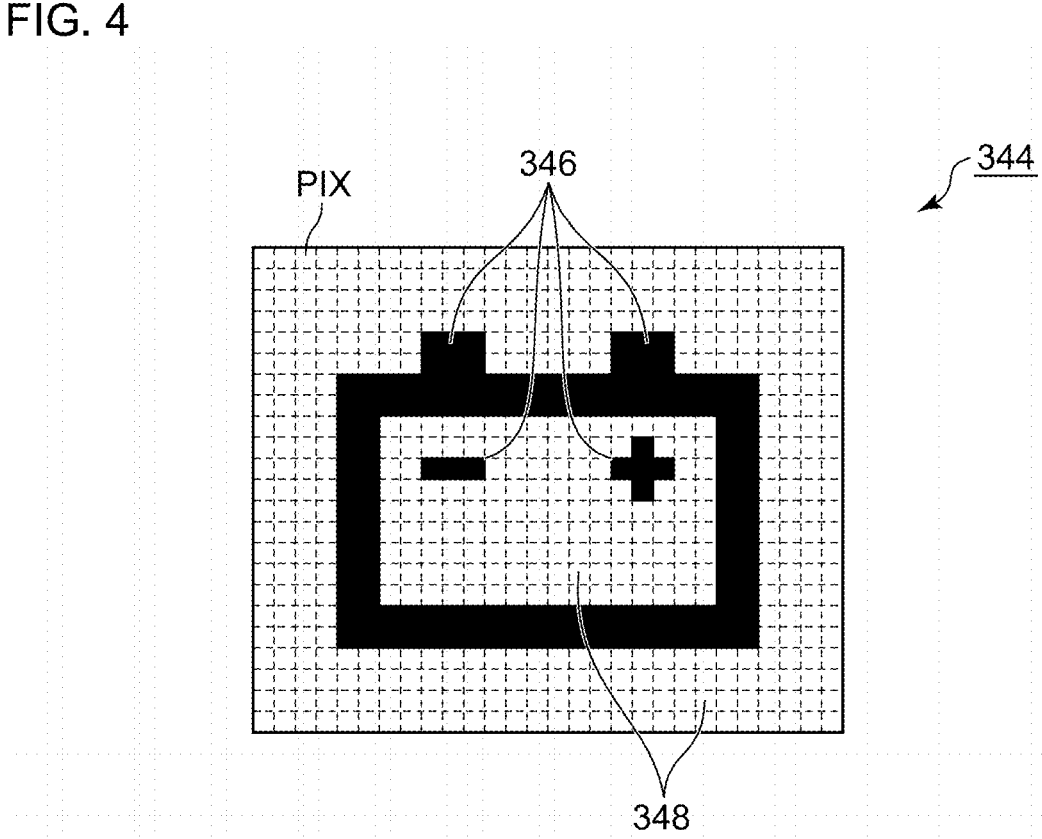
FIG. 4 is a diagram illustrating reference graphic data.

The memory 342 stores reference graphic data 344 describing the known character 402. FIG. 4 is a diagram illustrating the reference graphic data 344. The reference graphic data 344 can be considered as a replica data of the OSD character drawn by the OSD circuit 114. The reference graphic data 344 is prepared for each character 402, and when there are a plurality of characters 402, a plurality of pieces of reference graphic data 344 are prepared accordingly.

The reference graphic data 344 is used to distinguish between a drawing region 346 where a character is actually drawn and a background region 348 where a background other than the drawing region 346 is drawn. The reference graphic data 344 may include an α value indicating how transparent (or opaque) each pixel is. A pixel having an α value indicating that the pixel is transparent may be determined to be the background region 348, and a pixel having an α value indicating that the pixel is opaque may be determined to be the drawing region 346. The reference graphic data 344 may further include information on the color of each pixel in the drawing region 346.

The reference graphic data 344 may be bitmap data describing the shape of the character 402 or may be data obtained as a result of compressing the bitmap data. The compression method is not limited to any specific method, but, for example, Run-length encoding or the like is applicable. The reference graphic data 344 may be stored in the memory 342 of the semiconductor device 300 in a nonvolatile manner, or may be loaded from the host processor 120 or the graphic controller 110 upon the start of the semiconductor device 300.

Return to FIG. 3. The visibility detector 340 receives the video data 400 and checks the visibility of the known character 402 drawn on the video data 400 based on the reference graphic data 344. When the visibility is poor, an error signal VSB_ERR is asserted (for example, asserted HIGH). A result of the determination made by the visibility detector 340 is notified to the host processor 120 via the control input interface 320. The host processor 120 may perform error processing of, for example, changing the color of the OSD character.

The visibility detector 340 can determine whether the character 402 to be checked is included in the current frame, where the character 402 is drawn, or the like based on the information $S_5$.

Figure 5:
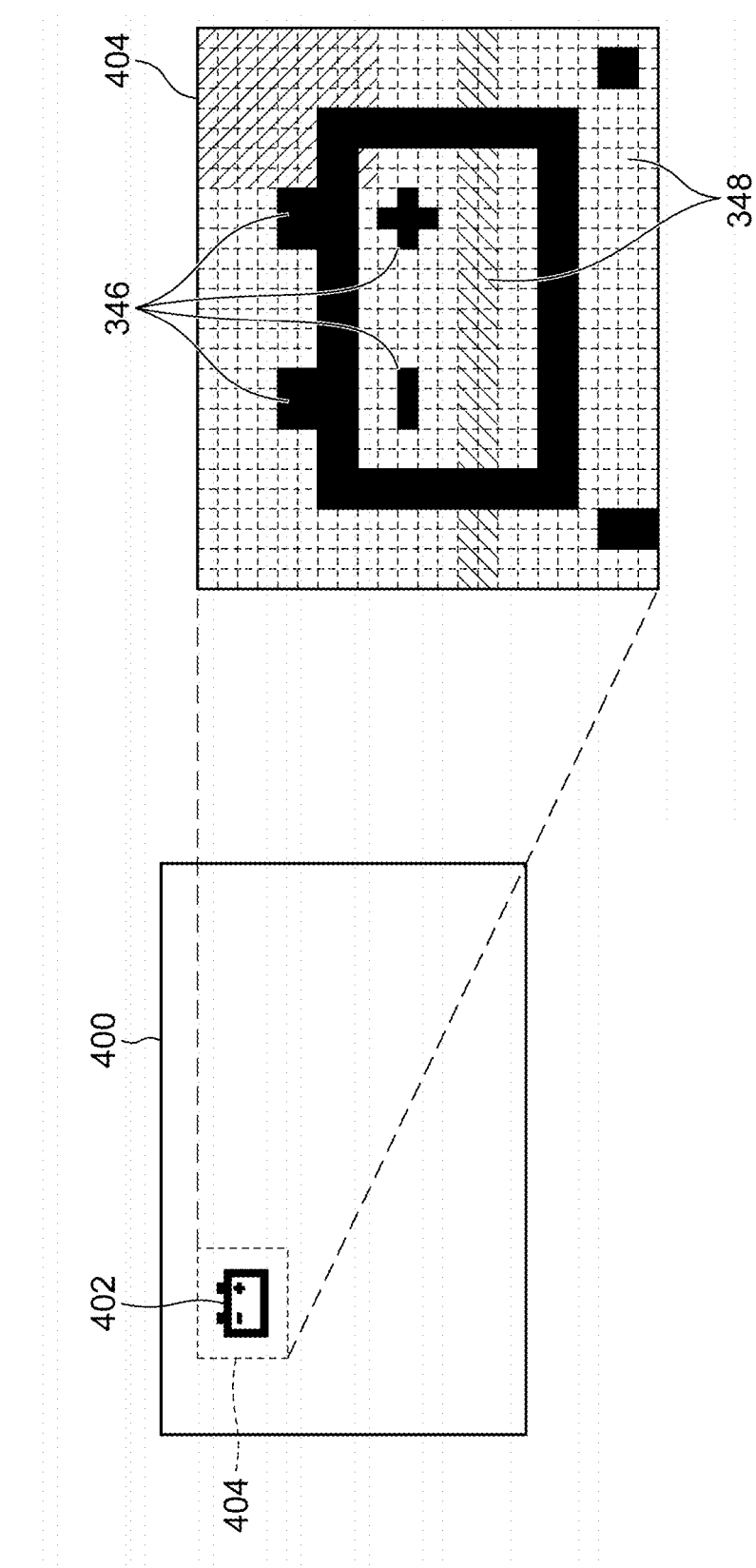
FIG. 5 is a diagram for describing how a visibility detector checks visibility.

The above has described the configuration of the semiconductor device 300. Next, a description will be given of how the semiconductor device 300 operates. FIG. 5 is a diagram for describing how the visibility detector 340 checks the visibility. The OSD character 402 is drawn on the video data 400. The visibility detector 340 defines a target region 404 where the OSD character 402 is drawn as a region to be checked. The target region 404 is the same in size as the reference graphic data 344 illustrated in FIG. 4.

The visibility detector 340 extracts the background region 348 from the target region 404 based on the reference graphic data 344, and determines whether the visibility is good or poor based on the background region 348. The method for checking the visibility is not limited to any specific method, but for example, the visibility detector 340 may determine whether the visibility is good or poor, on a pixel-by-pixel basis, for some or all pixels lying within the background region 348 based on a relationship between a pixel value (Ri, Gi, Gi) of each pixel and an RGB value (Rr, Gr, Br) of a reference color based on the color of the OSD character 402, and then determine the entire visibility of the target region 404 based on a result obtained by integrating results of determining the visibility of the plurality of pixels.

The above has described the operation of the semiconductor device 300. According to the semiconductor device 300, the graphic controller 110 stores the information on the known character 402 that is to be drawn in the video data 400 as the reference graphic data 344 in the memory 342 of the semiconductor device 300, so that the semiconductor device 300 can check the visibility.

This allows the semiconductor device 300 to provide the visibility check function when the graphic controller 110 has no visibility detection function.

Further, when the graphic controller 110 has the visibility detection function, a double check can be made by the graphic controller 110 and the semiconductor device 300. Furthermore, an abnormality or failure in the graphic controller 110 or the video input interface 310 of the semiconductor device 300, or noise coming into the video transmission line 130 may disturb the video data 400 and make the visibility of the character 402 lower. In this case, the visibility detector of the graphic controller 110 cannot detect the abnormality, but the visibility detector 340 of the semiconductor device 300 can detect the abnormality, so that the robustness of the image display system 100 can be increased.

Various devices and methods understood with reference to the block diagram and circuit diagram illustrated in FIG. 3 or derived from the above description fall within the scope of the present disclosure, and the present disclosure is not limited to any specific configuration. Hereinafter, more specific configuration examples and embodiments will be described in order not to narrow the scope of the present disclosure but to help understanding of the essence and operation of the disclosure and to provide a clear description of the disclosure.

Figure 6:
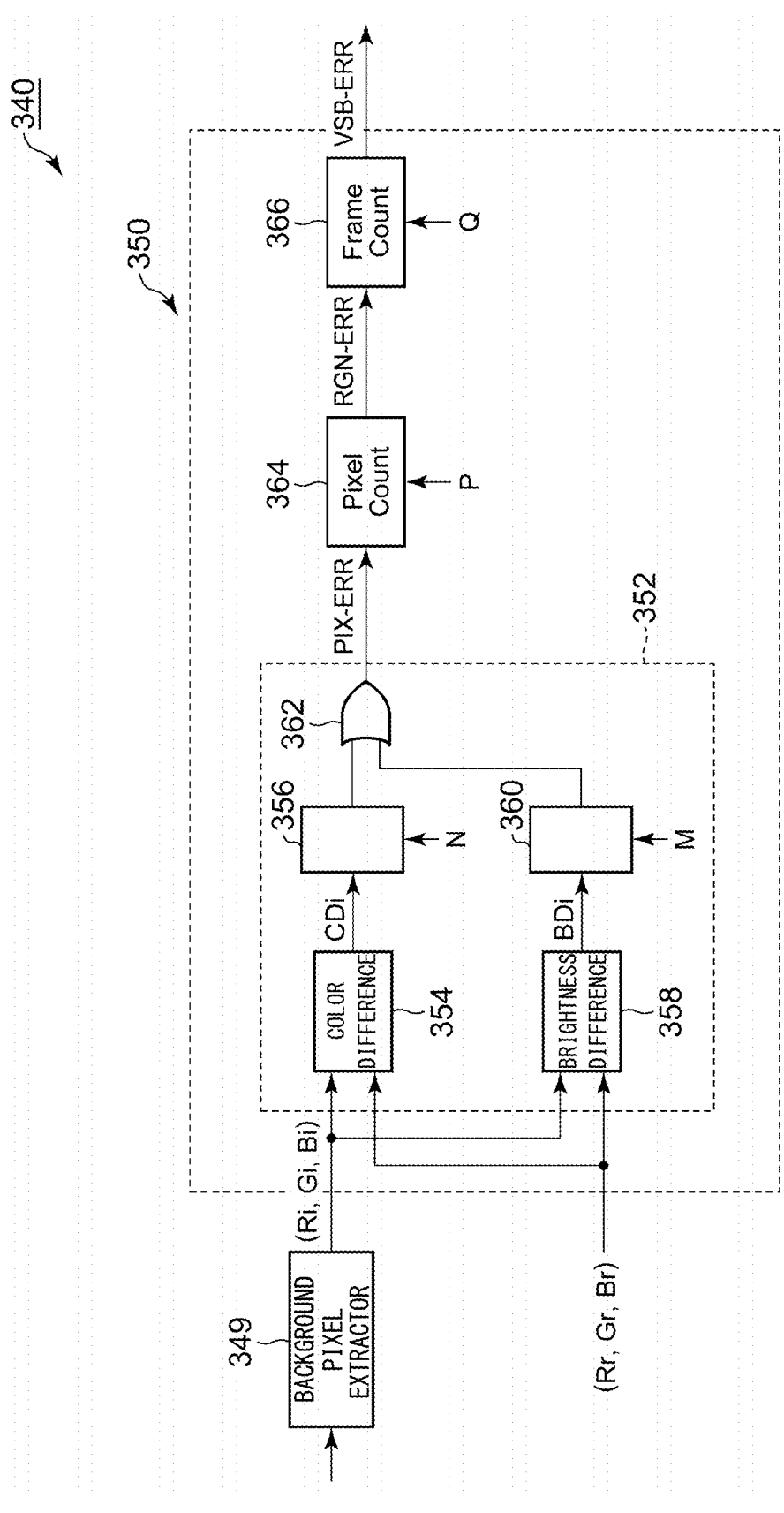
FIG. 6 is a block diagram of a configuration example of the visibility detector.

Next, a description will be given in detail of the visibility detector 340. FIG. 6 is a block diagram of a configuration example of the visibility detector 340. The visibility detector 340 includes a background pixel extractor 349 and a determiner 350. The background pixel extractor 349 extracts, from the target region 404 of the video data 400, pixels lying within the background region 348. A pixel value of each of the pixels thus extracted is denoted as Ri, Gi, Bi.

The determiner 350 determines the quality of each pixel lying within the background region 348 based on the pixel value (Ri, Gi, Bi) of the pixel and the reference pixel value (Rr, Gr, Br).

The determiner 350 includes a pixel determiner 352, a region determiner 364, and a final determiner 366. The pixel determiner 352 determines whether the visibility is good or poor for each of the plurality of pixels lying within the background region 348, and asserts a pixel error signal PIX_ERR when the visibility is poor.

The region determiner 364 counts the number of pixels having poor visibility, and determines that, when the number of pixels num_err_pix thus counted exceeds a pixel count threshold p, the visibility of the OSD character in the frame is poor, and asserts an RGN_ERR signal. The pixel count threshold p can be obtained as a result of multiplying the total number of pixels (that is, the character size) lying within the target region 404 or the total number of pixels lying within the background region 348 by a coefficient P. The coefficient P represents an error-allowable ratio. For example, P can be set, via a register, to a value within a range of 0.05% to 62.5%.

The final determiner 366 asserts a final error VSB_ERR when the RGN_ERR signal is continuously asserted over a predetermined number of frames Q. For example, Q can be set, via a register, to a value within a range of 0 to 15.

The pixel values (Ri, Gi, Bi) of pixels lying within the background region 348 (hereinafter, referred to as a background color) and the reference color (Rr, Gr, Br) are input to the pixel determiner 352. The reference color (Rr, Gr, Br) is a color uniquely determined for each OSD character 402. When the OSD character 402 is represented in a single color, the reference color (Rr, Gr, Br) may be the same as the color of the OSD character 402. When the OSD character 402 is represented in a plurality of colors, the reference color (Rr, Gr, Br) is determined based on the plurality of colors.

According to the present embodiment, the pixel determiner 352 checks an error based on a color difference CDi and a brightness difference BDi between the background color (Ri, Gi, Bi) and the reference color (Rr, Gr, Br). More specifically, when the color difference CDi is less than a color difference threshold T or the brightness difference BDi is less than a brightness difference threshold U, the pixel error PIX_ERR is asserted.

The pixel determiner 352 includes a color difference calculator 354, a color difference error detector 356, a brightness difference calculator 358, a brightness difference error detector 360, and an OR gate 362. The color difference calculator 354 calculates the color difference CDi based on the following equation (1):

$$CDi=|Ri-Rr|+|Gi-Gr|+|Bi-Br| \quad (1).$$

The color difference error detector 356 compares the color difference CDi with the color difference threshold T, and determines that, when CDi<T, a result of the comparison indicates an error and outputs HIGH.

The brightness difference calculator 358 calculates the brightness difference BDi based on the following equation (2):

$$BDi=|Ri-Rr|*0.299+|Gi-Gr|*0.587+|Bi-Br|*0.114 \quad (2).$$

The brightness difference error detector 360 compares the brightness difference BDi with the brightness difference threshold U, and determines that, when BDi<U, a result of the comparison indicates an error and outputs HIGH.

The color difference threshold T and the brightness difference threshold U may be defined as follows:
T=32*N
U=32*M, where N, M represent set values set, via a register, to a value within a range of 0 to 15.

Figure 7:
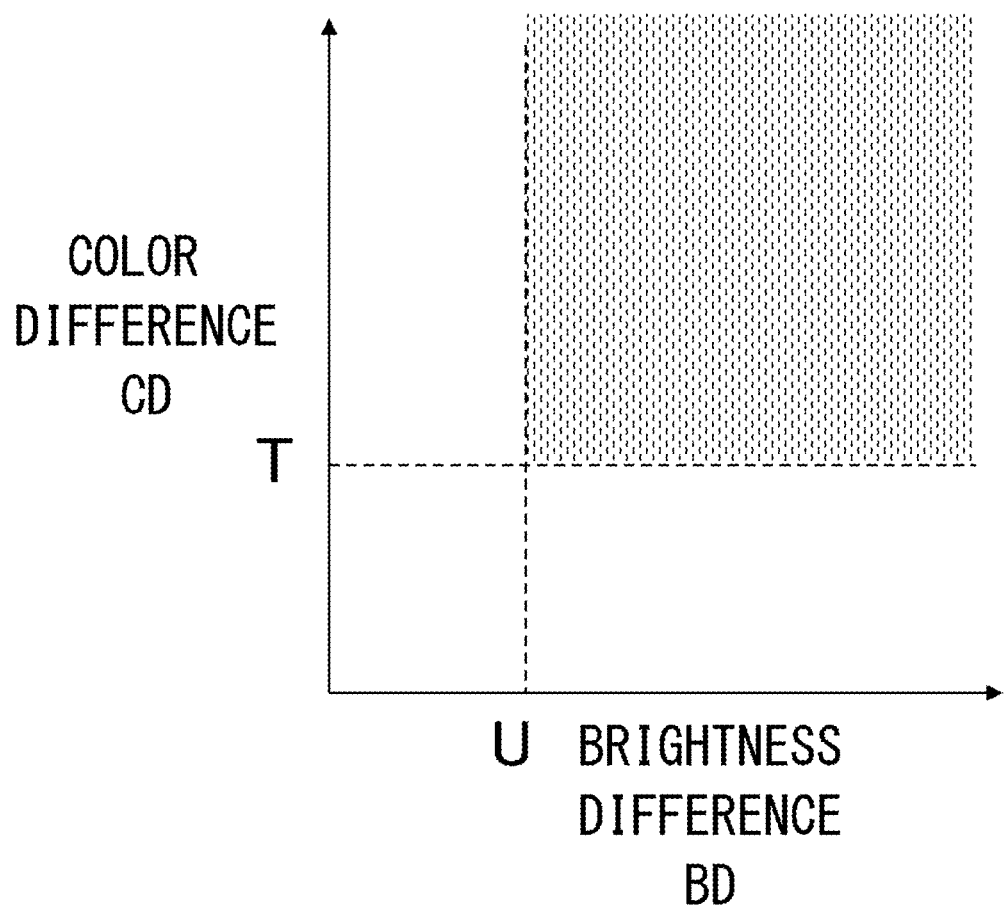
FIG. 7 is a diagram for describing how to determine visibility.

FIG. 7 is a diagram for describing how to determine the visibility. The hatched region is a region where the visibility is high, and the other region is an error region.

Second Embodiment

Figure 8:
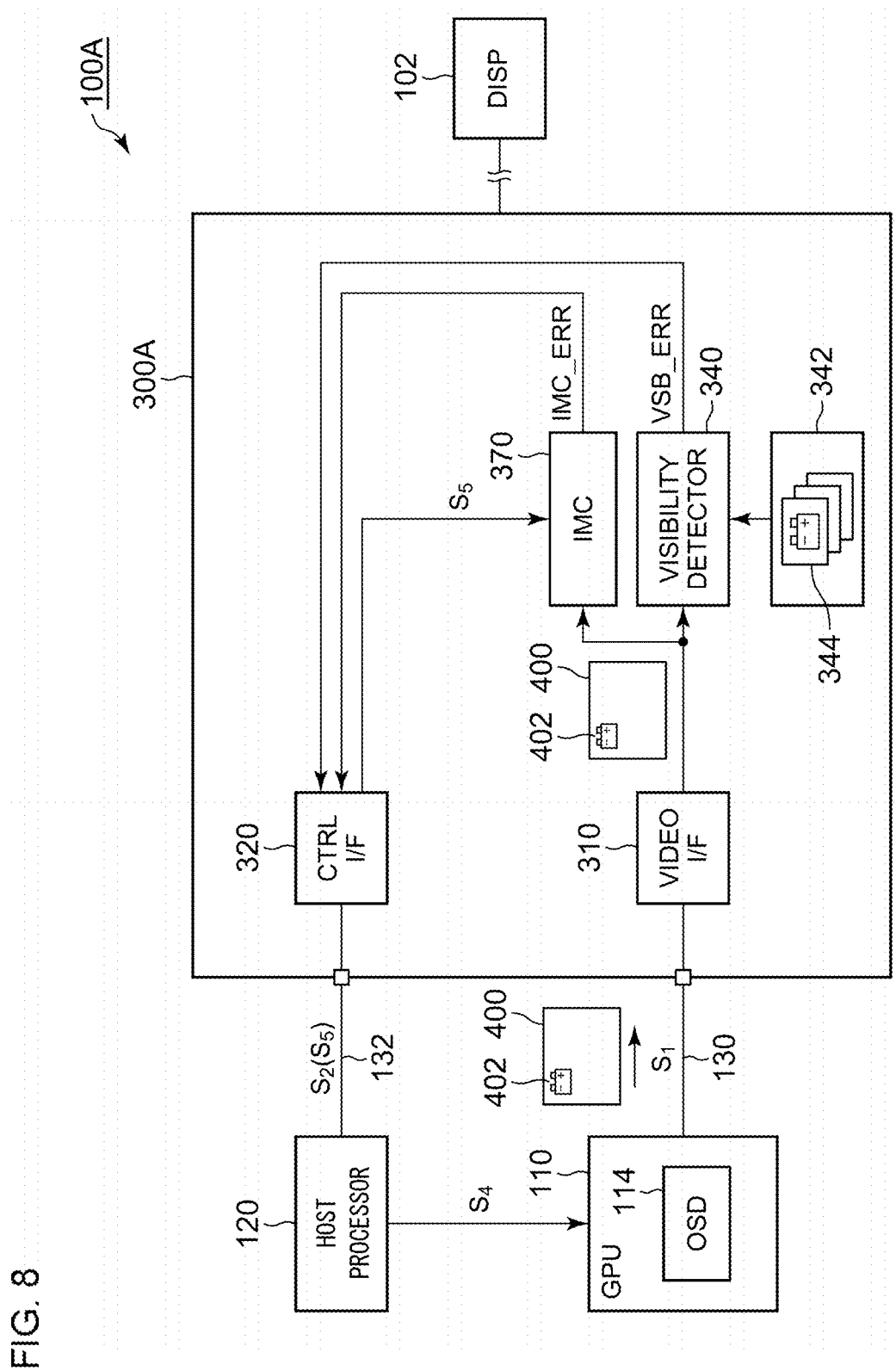
FIG. 8 is a block diagram of a semiconductor device according to a second embodiment.

FIG. 8 is a block diagram of a semiconductor device 300A according to a second embodiment. The semiconductor device 300A is provided based on the semiconductor device 300 illustrated in FIG. 3 and further includes an image error detector 370.

The image error detector 370 determines whether the character 402 drawn on the video data 400 is normal or abnormal based on the reference graphic data 344 stored in the memory 342.

The image error detector 370 may compare the pixel value of each pixel lying within the drawing region 346 with an expectation value of the pixel to determine whether the pixel value is equal to the expectation value. For example, the image error detector 370 may determine that a result of the comparison indicates an error when an error between the pixel value of a certain pixel and the expectation value of the pixel exceeds a predetermined threshold. The processing performed by the image error detector 370 is referred to as image comparison (IMC). The image error detector 370 may assert an image error signal (IMC_ERR), for example, when the number of error pixels exceeds a threshold. The result of the determination made by the image error detector 370 is notified to the host processor 120 via the control input interface 320.

The above has described the configuration of the semiconductor device 300A. According to the semiconductor device 300A, the image error detector 370 can detect an abnormality in the video input interface 310 or the graphic controller 110 or image disturbance due to noise.

The reference graphic data 344 can be shared between the visibility detector 340 and the image error detector 370, and this brings about an advantage that an increase in the capacity of the memory 342 can be suppressed.

Figure 9:
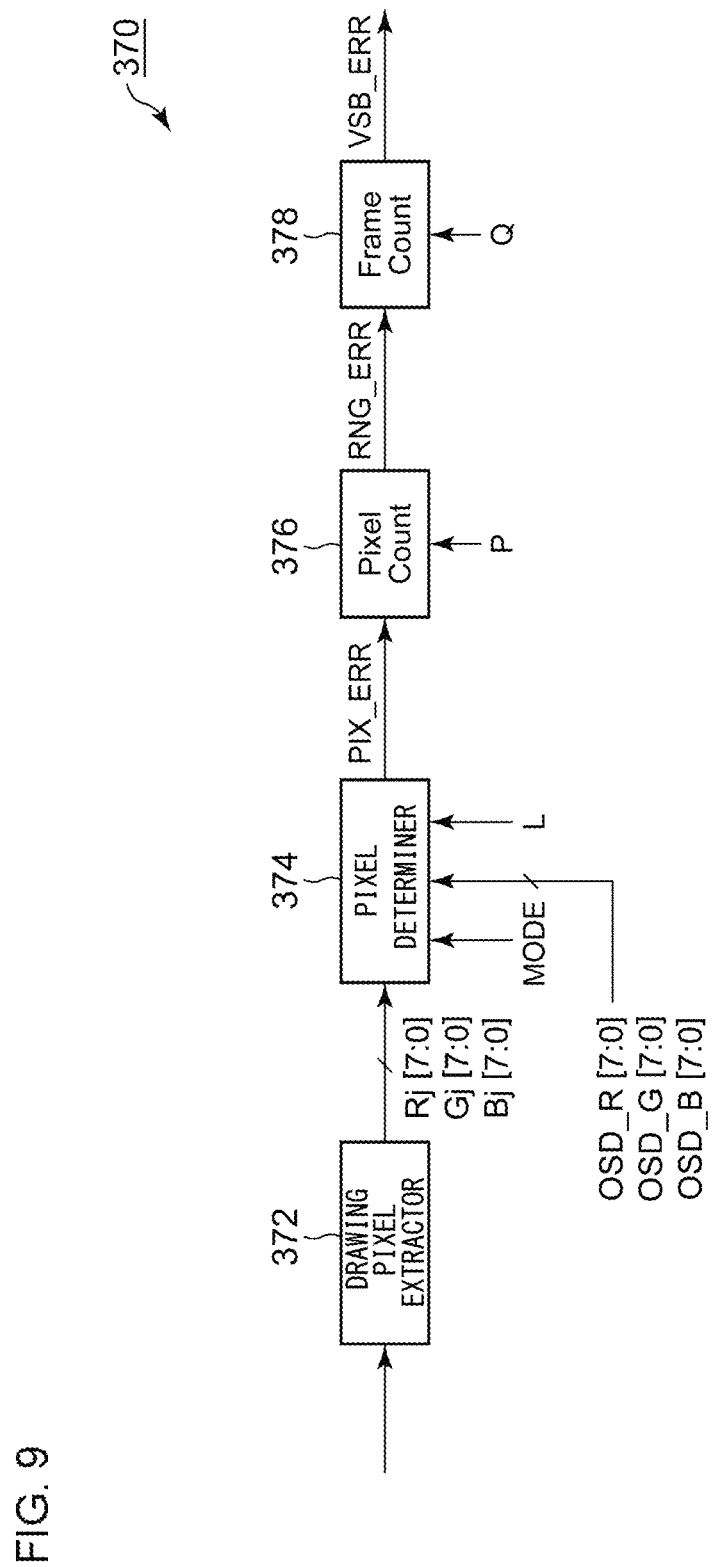
FIG. 9 is a block diagram of a configuration example of an image error detector.

FIG. 9 is a block diagram of a configuration example of the image error detector 370. The image error detector 370 includes a drawing pixel extractor 372, a pixel determiner 374, a region determiner 376, and a final determiner 378.

The drawing pixel extractor 372 extracts, from the target region 404 of the video data 400, pixels lying within the drawing region 346. A pixel value of each of the pixels thus extracted is denoted as Rj, Gj, Bj.

The pixel determiner 374 determines whether the pixel has an error based on an error between the pixel value Rj, Gj, Bj of each of the plurality of pixels lying within the drawing region 346 and the expectation value. Assume that the expectation value of each pixel is denoted as OSD_R, OSD_G, OSD_B.

The pixel determiner 374 may support two determination modes. In a first determination mode,
when any one of $|Rj-\text{OSD\_}R|>16*L,$ $|Gj-\text{OSD\_}G|>16*L,$ or $|Bj-\text{OSD\_}B|>16*L$ is satisfied, the pixel is determined to have an error. L represents a parameter for use in setting a threshold and can be set, via a register, to a value within a range of 0 to 15. In this determination mode, a state where the character is not correctly lit is detected as an error.

In a second determination mode,
when all of $|Rj-\text{OSD\_}R|\leq16*L,$ $|Gj-\text{OSD\_}G|\leq16*L,$ and $|Bj-\text{OSD\_}B|\leq16*L$ are satisfied, the pixel is determined to have an error. In this determination mode, a state where the character is not correctly lit off is detected as an error.

The region determiner 376 counts the number of pixels having poor visibility, and determines that, when the number of pixels num_err_pix thus counted exceeds a pixel count threshold p, the visibility of the OSD character in the frame is poor, and asserts an RGN_ERR signal. The pixel count threshold p can be obtained as a result of multiplying the total number of pixels (that is, the character size) lying within the target region 404 or the total number of pixels lying within the background region 348 by a coefficient P. The coefficient P represents an error-allowable ratio. For example, P can be set, via a register, to a value within a range of 0.05% to 62.5%.

The final determiner 378 asserts a final error VSB_ERR when the RGN_ERR signal is continuously asserted over a predetermined number of frames Q. For example, Q can be set, via a register, to a value within a range of 0 to 15.

The visibility detector 340 and the image error detector 370 may alternately detect an error every other frame.

Figure 10:
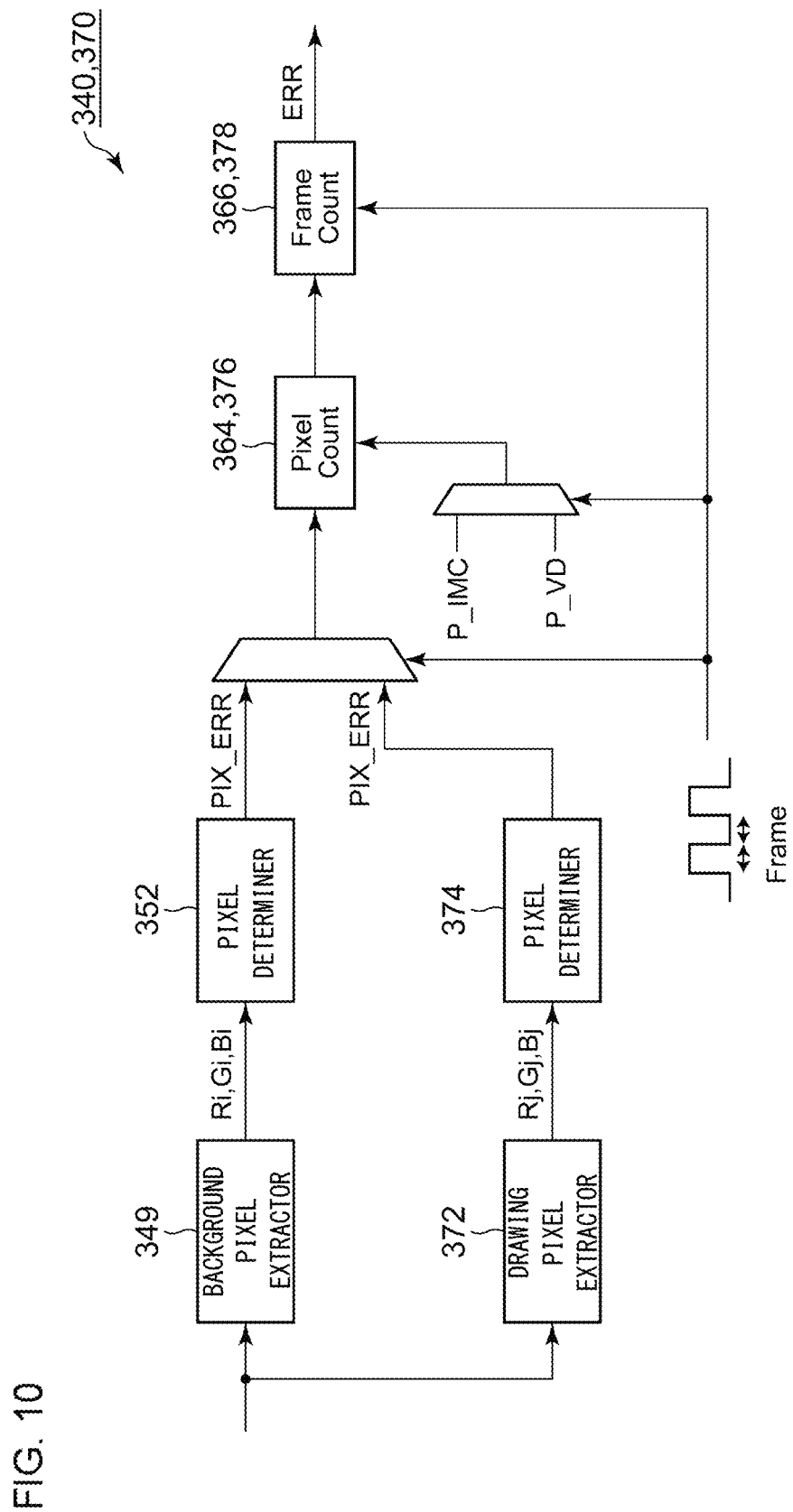
FIG. 10 is a block diagram of a unit obtained as a result of unifying the visibility detector and the image error detector.

FIG. 10 is a block diagram of a unit obtained as a result of unifying the visibility detector 340 and the image error detector 370. The region determiner 364 and the region determiner 376 are used on a shared basis, and the final determiner 366 and the final determiner 378 are used on a shared basis. A selector SEL1 alternately selects the output of the pixel determiner 352 or the output of the pixel determiner 374 every other frame. For example, on an odd-numbered frame, the visibility detector 340 may be enabled to check the visibility, and on an even-numbered frame, the visibility detector 340 may be enabled to make the IMC. A selector SEL2 may switch the threshold P used by the region determiner 364 (376) between a visibility check value P_VD and an IMC value P_IMC every frame.

The configuration illustrated in FIG. 10 where the counter and the like are used on a shared basis can suppress an increase in hardware.

Third Embodiment

Figure 11:
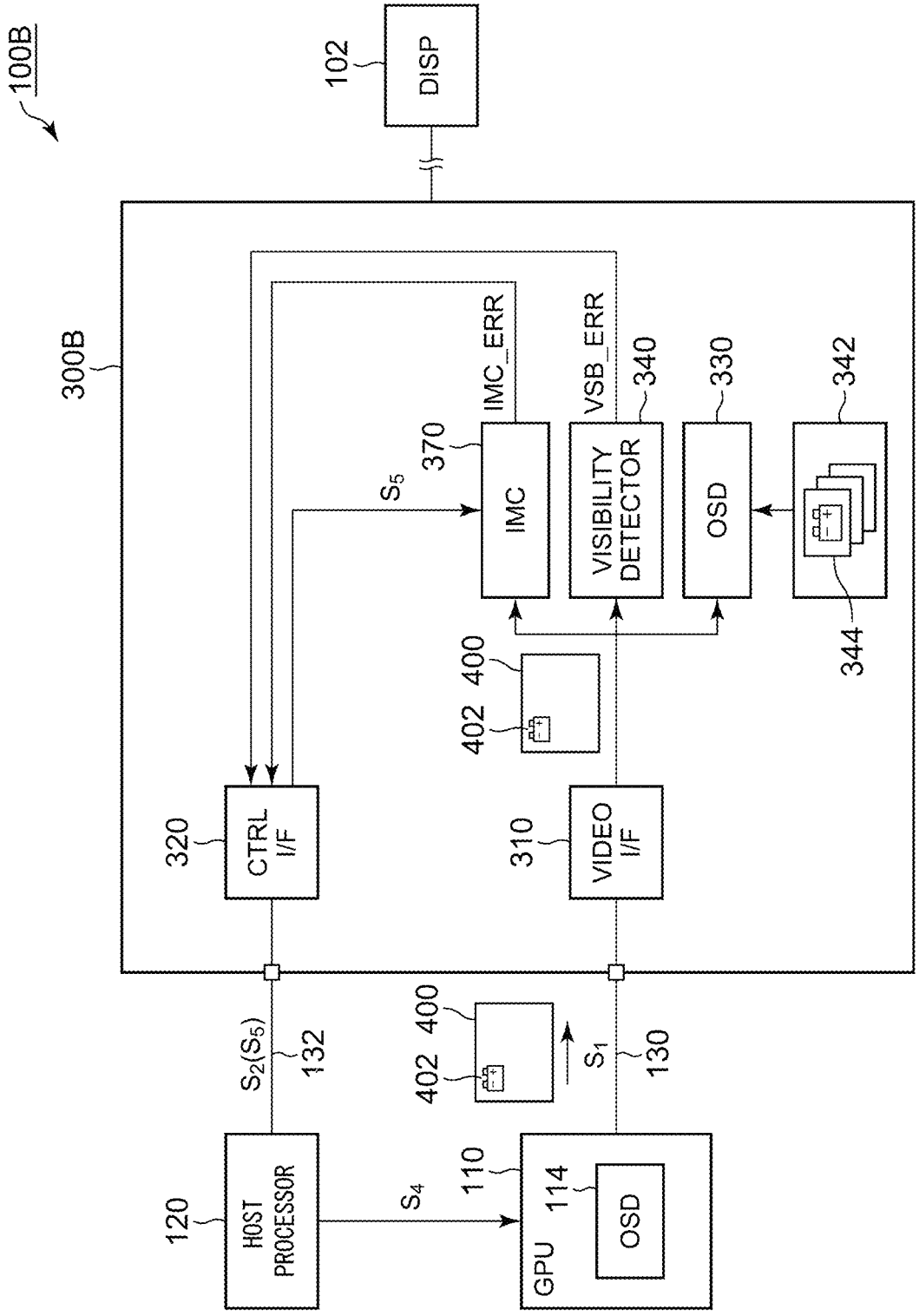
FIG. 11 is a block diagram of a semiconductor device according to a third embodiment.

FIG. 11 is a block diagram of a semiconductor device 300B according to a third embodiment. The semiconductor device 300B is provided based on the semiconductor device 300A illustrated in FIG. 8 (or the semiconductor device 300 illustrated in FIG. 3) and further includes an OSD circuit 330.

The control data $S_2$ transmitted from the host processor 120 to the control input interface 320 includes an OSD display command $S_3$.

The OSD circuit 330 overlays an OSD character corresponding to the display command $S_3$ on the target region on the video data 400.

According to this embodiment, the reference graphic data 344 can be used as the OSD character.

For example, when the image error detector 370 detects an error, the host processor 120 may switch from the OSD character drawing by the graphic controller 110 to the character drawing by the OSD circuit 330. The OSD circuit 330 is provided at a stage subsequent to the video input interface 310, so that the OSD circuit 330 is less susceptible to the influence of an abnormality in the video input interface 310 or noise, and it is thus possible to display a normal character even at the time of abnormality.

Figure 12A:
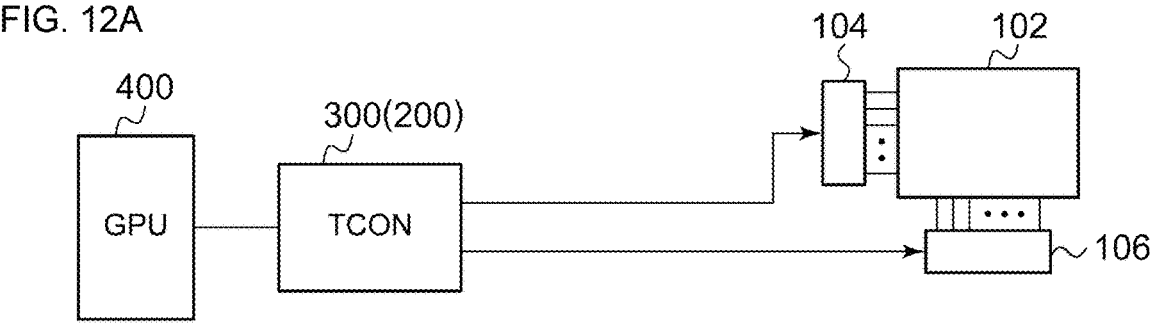
FIG. 12A to FIG. 12D are diagrams illustrating specific applications of the semiconductor device.

Next, a description will be given of an application of the semiconductor device 300. FIG. 12A to FIG. 12D are diagrams illustrating specific applications of the semiconductor device 300. In FIG. 12A, the semiconductor device 300 serves as a timing controller 200. The timing controller 200 receives a digital video signal from the graphic controller 110 and controls a gate driver 104 and a source driver 106.

Figure 12B:
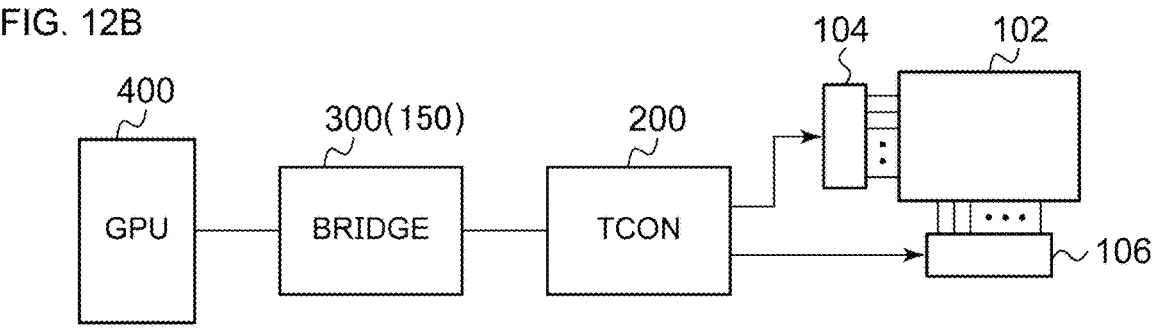

In FIG. 12B, the semiconductor device 300 serves as a bridge chip 150. The bridge chip 150 is provided between the graphic controller 110 and the timing controller 200 and serves as a bridge between an output interface of the graphic controller 110 and an input interface of the timing controller 200.

Figure 12C:
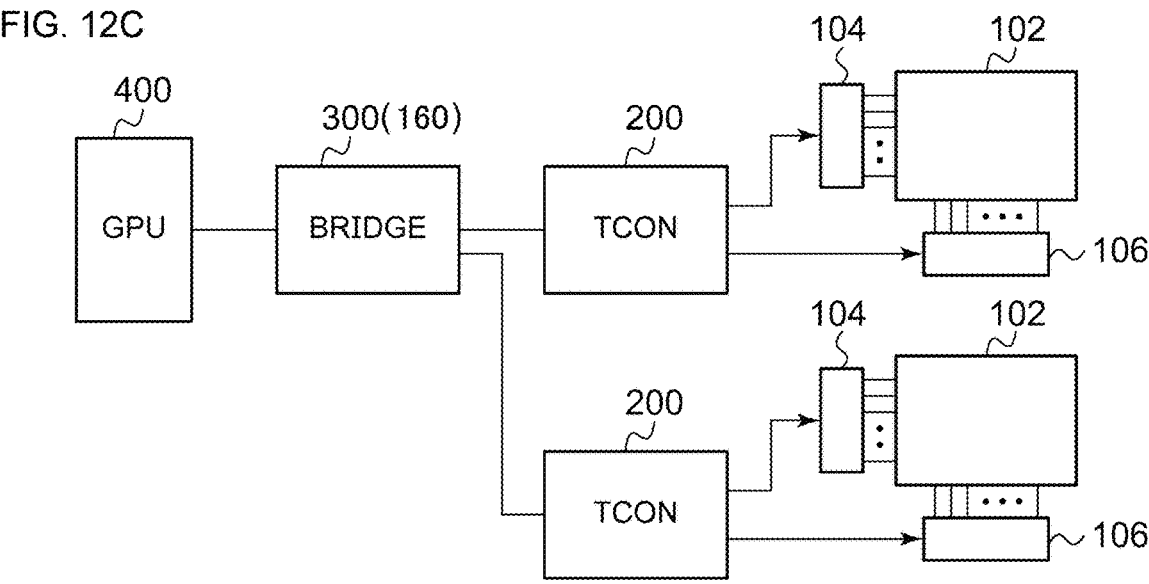

In FIG. 12C, the semiconductor device 300 serves as a bridge chip 160. The bridge chip 160 causes the video signal from the graphic controller 110 to branch to a plurality of systems. The bridge chip 160 may distribute the same video signal as the input video signal to a plurality of systems. Alternatively, the bridge chip 160 may divide the input video signal into a plurality of regions (screens) and distribute the regions to a plurality of systems.

Figure 12D:
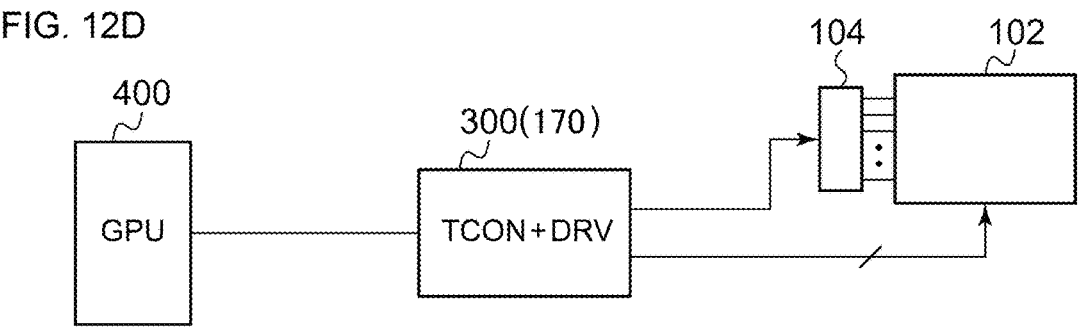

In FIG. 12D, the semiconductor device 300 serves as a one-chip driver 170. The one-chip driver 170 is capable of acting as a timing controller and a display driver (source driver).

Each of the image display systems illustrated in FIG. 12A to FIG. 12D is applicable to various display devices including an on-vehicle display, a medical display, a television, and a PC display. Alternatively, the image display system may be built in an electronic device such as a laptop computer, a tablet terminal, a smartphone, a digital camera, or a digital video camera.

Figure 13A:
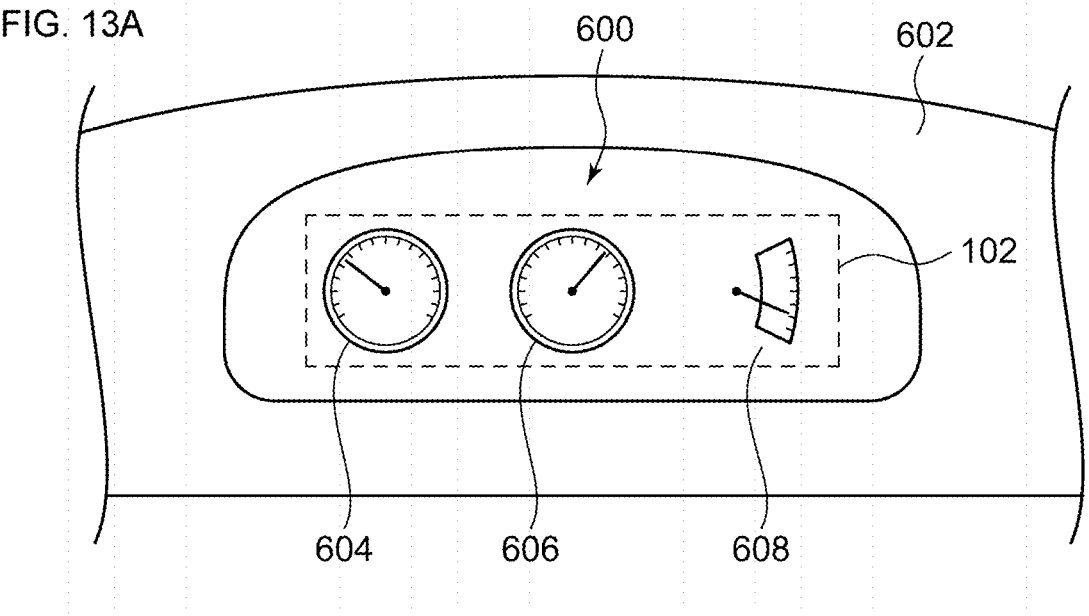
FIG. 13A to FIG. 13C are diagrams illustrating an on-vehicle display device according to an embodiment.

FIG. 13A is a diagram illustrating an on-vehicle display device 600 according to an embodiment. The on-vehicle display device 600 is embedded in a console 602 provided in front of a cockpit, receives, from a vehicle-side processor, a digital video signal (video data) $S_1$ including a speedometer 604, a tachometer 606 indicating a rotation speed of an engine, a fuel gauge indicating an amount of remaining fuel 608 or a remaining battery power for a hybrid vehicle or an electric vehicle, and displays the digital video signal $S_1$ (FIG. 13A).

Figure 13B:
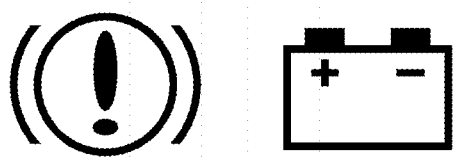

Conventionally, as illustrated in FIG. 13B, an indicator or warning light (hereinafter, simply referred to as a warning light) indicating some abnormality or battery charging problem is displayed outside the display panel by using an independent LED. The reason why the warning light is not displayed on the display panel is as follows. That is, the semiconductor device 300 (the timing controller 200) and the graphic controller 110 are connected to each other via a differential serial interface, and image data cannot be transmitted during a period from the start of the system until the establishment of the serial interface link between the timing controller 200 and the graphic controller 110, so that an image cannot be displayed on the display panel 102. Alternatively, after the link establishment, when the link is interrupted due to noise or the like, an image cannot be displayed on the display panel 102 until the link is established again. The same applies to a case where a cable is disconnected or broken, and a case where the serial interface or a part of the graphic controller 110 is in failure. A state where an image cannot be displayed as described above is referred to as a "non-displayable state".

Since the warning light includes important information to be notified to a driver, it is required that the warning light can be turned on even in the non-displayable state. Under such circumstances, it is necessary to provide the warning light outside the display panel.

On the other hand, the warning light can be displayed on the display panel by the OSD function using another form of the timing controller 200 or the semiconductor device 300 according to the embodiment. This is because the display of the OSD does not require communication via the differential serial interface. This eliminates the need for an LED and a drive circuit of the LED, so that the cost can be reduced. Further, a standard function of the ECU such as $I^2C$ can be used, so that the cost can be further reduced.

Figure 13C:
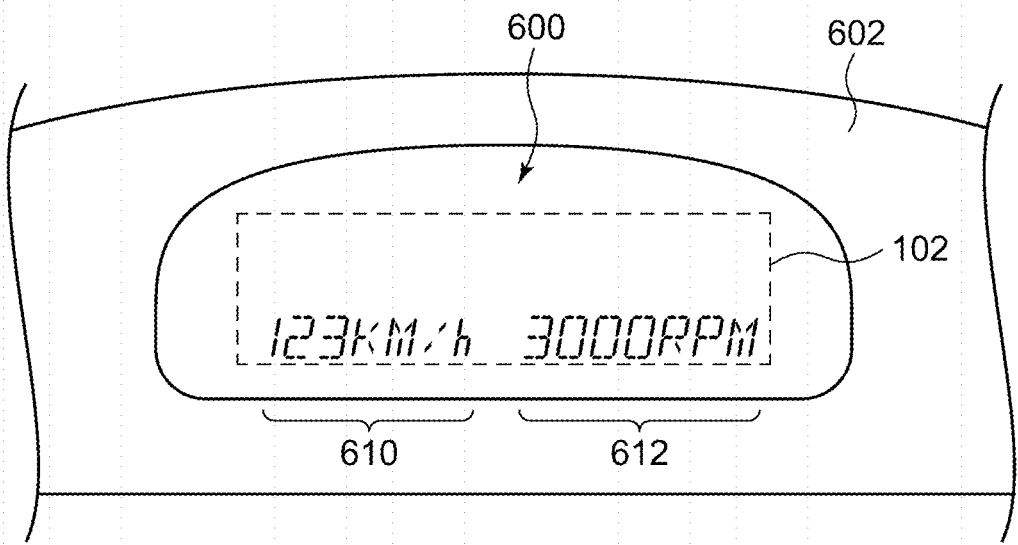

Further, when a situation (non-displayable state) where the video data $S_1$ cannot be displayed occurs in the on-vehicle display device 600, the display panel 102 blacks out, which hinders driving. Therefore, numbers, alphabets, and the like may be prepared as OSD characters. As illustrated in FIG. 13C, when some abnormality occurs during traveling to make the speedometer 604 or the tachometer 606 non-displayable, it is possible to display vehicle speed information 610 and engine speed information 612 in real time by using the OSD function, thereby allowing an increase in safety.

Alternatively, when the ignition of a vehicle is switched on and the on-vehicle display device 600 is put into operation, a character string such as "PLEASE WAIT . . . " or the current time can be displayed by using the OSD function until the video data $S_1$ can be displayed.

The timing controller 200 that is one form of the semiconductor device 300 is applicable to a medical display device. The medical display device displays information necessary for a doctor or a nurse during examination, treatment, or surgery. In the medical display device, even in a situation where the video data $S_1$ cannot be displayed, important information (for example, heart rate, blood pressure, and the like of a patient) can be displayed by using the OSD function.

Figure 14:
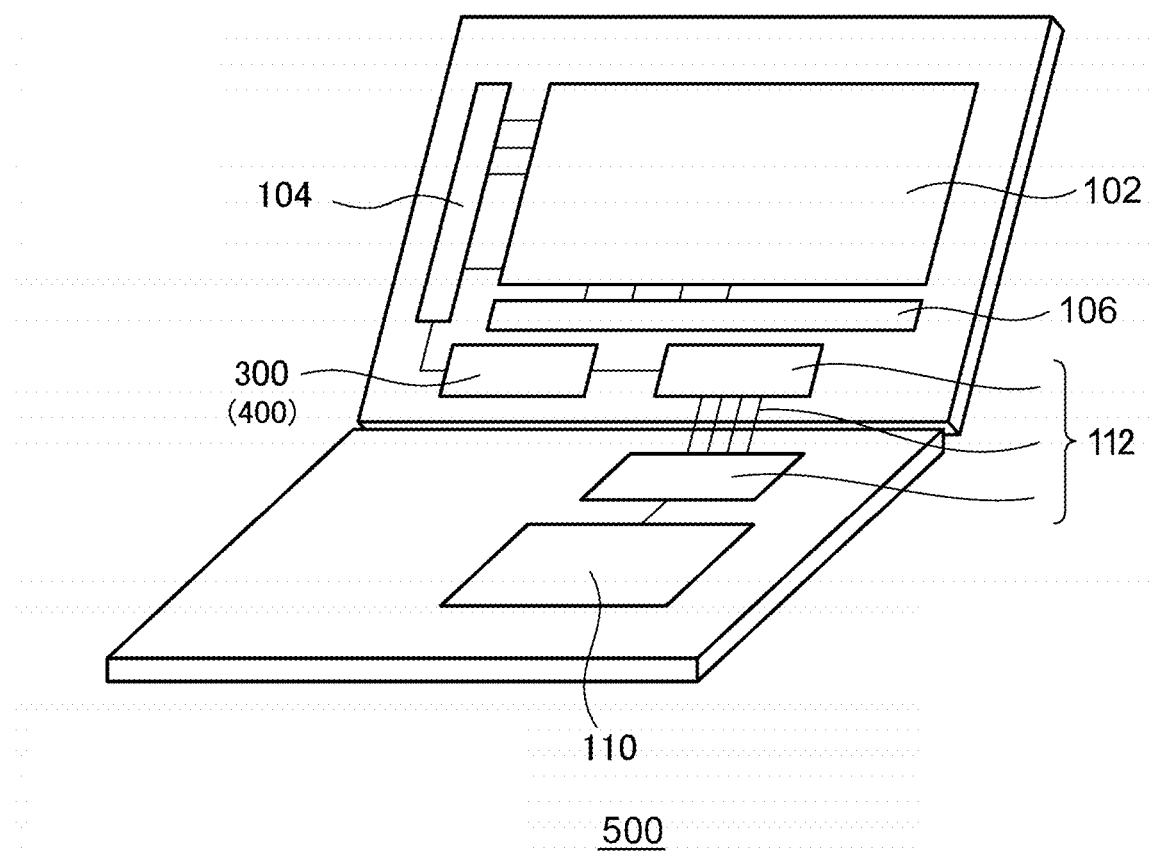
FIG. 14 is a perspective view of an electronic device.

FIG. 14 is a perspective view of an electronic device 500. The electronic device 500 illustrated in FIG. 14 may be a laptop computer, a tablet terminal, a smartphone, a portable game console, an audio player, or the like. The electronic device 500 includes the graphic controller 110, the display panel 102, the gate driver 104, and the source driver 106, all contained in a casing 502. A transmission apparatus 112 including a differential transmitter, a transmission channel, and a differential receiver may be provided between the timing controller 200 and the graphic controller 110.

The present disclosure has been described based on the embodiments. It is to be understood by those skilled in the art that the embodiments are illustrative and that various modifications are possible for a combination of components or processes, and that such modifications are also within the scope of the present disclosure. Next, a description will be given of such modifications.

First Modification

The determination method implemented by the determiner 350 is not limited to the method described in the embodiments. For example, the determination may be made based on only the color difference or only the brightness difference. Alternatively, instead of or in addition to the color difference and the brightness difference, the determination may be made based on a contrast.

Second Modification

In the embodiments, a description has been given of how to check the visibility of the OSD character 402, but the character 402 to be checked is not limited to a character drawn by the OSD.

Although the present disclosure has been described using specific phrases based on the embodiments, the embodiments merely illustrate the principle and application of the present disclosure, and many modifications and changes in arrangement can be made to the embodiments without departing from the spirit of the present disclosure recited in claims.

What is claimed is:

1. A semiconductor device comprising:
    a video input interface structured to receive digital video data on which a known character is drawn from an external graphic processor;
    a memory structured to store reference graphic data describing the known character;
    a visibility detector structured to check, based on the reference graphic data, visibility of the known character that is drawn on the video data; and
    a control input interface provided separately from the video input interface, wherein the semiconductor device is structured to communicate with an external host processor,
    wherein the visibility detector is structured to determine whether the visibility is good or poor for each of a plurality of pixels constituting a background lying within a target region where the known character is drawn,
    wherein when the number of pixels poor in the visibility exceeds a pixel count threshold, the known character is determined to be poor in the visibility,
    wherein the semiconductor device is structured to notify the external host processor of a result of the determination made by the visibility detector via the control input interface,
    wherein the semiconductor device further comprises a drawing error detector structured to determine whether the known character drawn on the video data is normal or abnormal based on the reference graphic data,
    and wherein the visibility detector and the drawing error detector are alternately put into operation every other frame.

2. The semiconductor device according to claim 1, wherein
    the known character is variable in display position, and a control signal received by the control input interface from the processor includes position information indicating the display position of the known character.

3. The semiconductor device according to claim 1, further comprising an on screen display (OSD) circuit structured to draw an OSD character on the video data.

4. The semiconductor device according to claim 3, wherein
the OSD circuit is capable of drawing the known character described by the reference graphic data as the OSD character.

5. The semiconductor device according to claim 1, serving as a timing controller.

6. The semiconductor device according to claim 1, serving as a one-chip driver capable of acting as a timing controller and a source driver.

7. The semiconductor device according to claim 1, serving as a bridge circuit having an M input and an N output, where $M \geq 1$, and $N \geq 1$.

8. An on-vehicle display system comprising a semiconductor device according to claim 1.

9. An electronic device comprising a semiconductor device according to claim 1.

10. The semiconductor device according to claim 1, wherein the external processor and the control input interface are coupled to communicate bidirectionally, and wherein the external processor is structured to change a color of the known character based on the result of the determination made by the visibility detector.

\* \* \* \* \*